United States Patent [19]

Pagel

[11] Patent Number: 4,479,747

[45] Date of Patent: Oct. 30, 1984

[54] PRELOADED LOCKNUT

[75] Inventor: Paul V. Pagel, Ontario, Calif.

[73] Assignee: Microdot Inc., Darien, Conn.

[21] Appl. No.: 487,850

[22] Filed: Apr. 21, 1983

[51] Int. Cl.³ .............................................. F16B 19/00
[52] U.S. Cl. .......................................... 411/8; 411/427
[58] Field of Search ............... 411/8, 9, 10, 11, 12, 411/368, 369, 544, 543, 272, 265, 277, 427, 155

[56] References Cited

U.S. PATENT DOCUMENTS

| | | | |
|---|---|---|---|
| 1,391,378 | 9/1921 | Gaston | 411/155 |
| 1,762,651 | 6/1930 | Chism | 411/155 X |
| 2,375,325 | 5/1945 | Robertson | 411/277 X |
| 3,104,645 | 9/1963 | Harrison | 411/8 X |
| 3,135,154 | 6/1964 | Zenzie | 411/12 |
| 3,144,803 | 8/1964 | Briles | 411/427 |
| 3,169,440 | 2/1965 | Taylor | 411/11 |
| 3,181,413 | 5/1965 | Wing | 411/34 |
| 3,742,808 | 7/1973 | Trembley | 411/432 |
| 3,783,734 | 1/1974 | Uelthoven | 411/8 |
| 4,076,064 | 2/1978 | Holmes | 411/285 |
| 4,131,050 | 12/1978 | Holmes | 411/10 |
| 4,171,012 | 10/1979 | Holmes | 411/436 |
| 4,293,257 | 10/1981 | Peterson | 411/11 |
| 4,381,163 | 4/1983 | Witte et al. | 411/311 |

FOREIGN PATENT DOCUMENTS

| | | | |
|---|---|---|---|
| 166730 | 11/1908 | Fed. Rep. of Germany | 411/427 |
| 2421300 | 11/1979 | France | 411/11 |
| 1476920 | 6/1977 | United Kingdom | 411/155 |

Primary Examiner—Alexander Grosz
Assistant Examiner—Rodney M. Lindsey
Attorney, Agent, or Firm—Lyman R. Lyon

[57] ABSTRACT

The disclosure relates to a fastener assembly comprising a nut and a washer that insures a minimum preload on the nut and bolt assembly by load indicator means which also maintain the nut and washer in a joint preassembly.

1 Claim, 4 Drawing Figures

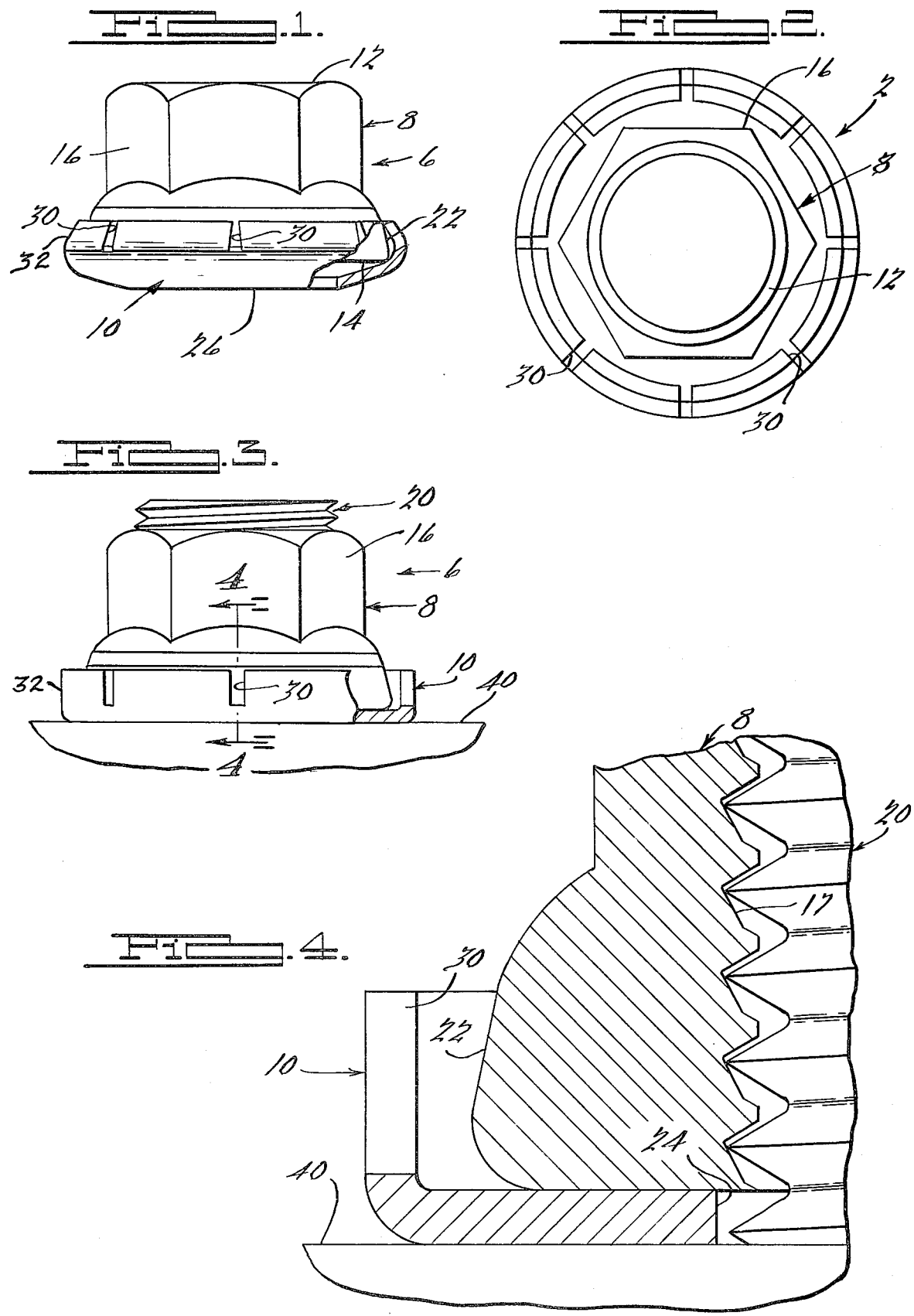

PRELOADED LOCKNUT

BACKGROUND OF THE INVENTION

Nuts having an internal thread with a wedge ramp at the root thereof, of the type disclosed in U.S. Pat. No. 4,076,064, are often used in combination with standard bolts to enhance the ability of the nut and bolt assembly to maintain its integrity in vibratory environments. However, the nature of the wedge ramp is such that reduction of axial load on the nut and bolt assembly below a predetermined level, caused by, for example, thermal expansion and lengthening of the bolt, may induce loosening. This problem may be solved by insuring that a minimum axial load or "preload" is maintained on the nut and bolt assembly.

SUMMARY OF THE INVENTION

To solve the aforesaid problem, a preload washer is attached to the base of a hexagonal nut to maintain a predetermined minimum axial load on the nut and bolt asssembly. The minimum load is achieved by the bias resulting from deflection of a convexly curved portion of the preload washer upon initial torquing of the nut. The convex portion of the preload washer is deflected until the washer is flattened against a bearing surface. Visual indication of condition is given by the orientation of a plurality of slots on the washer.

Additional torque is applied to the nut of the assembly after a minimum preload is attained by the washer as required. The washer insures that a minimum axial load is maintained at all times on the nut and bolt assembly despite temperature variations.

BRIEF DESCRIPTION OF THE DRAWINGS

FIG. 1 is a side elevation of a nut and preload washer in accordance with a constructed embodiment of the instant invention, partly broken away for clarity.

FIG. 2 is a top plan view of the nut of FIG. 1.

FIG. 3 is a side elevation of the nut and washer of FIG. 1, assembled on a bolt and subjected to load.

FIG. 4 is an enlarged sectional view, taken along the line 4—4 of FIG. 3.

DETAILED DESCRIPTION OF THE PREFERRED EMBODIMENT OF THE INVENTION

A nut and preload washer assembly 6, in accordance with a constructed embodiment of the instant invention, comprises a plated corrosion resistant nut 8 and a dished preload washer 10. The nut 8 has a flat top surface 12, a flat bottom surface 14, and an aperture with a "wedge ramp" internal thread form 17 extending therethrough. The nut 8 has a hexagonal wrenching surface 16 to facilitate torquing thereof relative to a bolt 20.

In accordance with one feature of the present invention, the nut 8 has a truncated conical section 22 at its base for the retention of the unloaded washer 10. The washer 10 has a central aperture 24 slightly larger than the major diameter of the thread 17 of the nut 8 to facilitate acceptance of the bolt 20 therethrough.

The washer 10 has a normally convex bottom surface 26 which, upon flattening thereof, effects an upward bias on the nut 8.

The washer 10 has slots 30 in an upstanding flange 32 to accommodate deflection thereof to the conical configuration of the base section 22 of the nut 8. Opposed walls of the slots 30 are convergent to each other when the tension washer 10 is unstressed but move into parallel relationship when the nut 8 is fully advanced onto the bolt 20, giving visual indication that the assembly 6 is fully loaded as seen in FIG. 3.

As torque is applied to the hexagonal wrenching surface 16 of the nut 8, the bolt advances through the nut 8. Advancement of the bolt 20 through the nut 8 brings the convex surface 26 of the washer 10 into contact with a workpiece 40, whereupon the convex surface 26 of the washer 10 is flattened. The resultant spring bias on the nut 8 tends to maintain the bolt 20 in tension. Continued torquing of the nut 8 brings the nut 8 to a designated assembly load.

In accordance with the invention, the slots 30 are orientated in parallel relation when the convex surface 26 of the washer 10 is flexed into a plane.

Further torque applied to the hexagonal wrenching surface 16 of the nut 8 brings the assembly 6 to full joint load requirements.

As best seen in FIG. 4, an upward bias on the nut 8 relative to a complementary bolt 20 due to compression of the washer 10 maintains the ramp on the internal thread form 17 of the nut 8 in engagement with the crest of the thread on the bolt 20. Such engagement insures that a minimum level of prevailing torque exists between the nut 8 and bolt 20 to preclude spurious disassembly.

While the preferred embodiment of the invention has been disclosed, it should be appreciated that the invention is susceptible of modification without departing from the scope of the following claims.

I claim:

1. A fastener assembly comprising
an internally threaded nut having a thread of substantially uniform pitch with a wedge ramp at the root thereof diverging with respect to its central axis in a direction toward one end thereof, said nut having a truncated conical external portion divergent toward and located at the other end thereof,
an externally threaded element having a standard thread sized so as to be receivable in said internally threaded element, the thread of said externally threaded element having a crest that exhibits an interference fit with the wedge ramp on the thread of said internally threaded element when said assembly is under load, and
a preload washer permanently assembled with said nut and having a dished section normally spaced from the other end of said nut and a radially outer periphery engaged at all times with the other end of said nut, said washer having a conical flange at the outer periphery thereof extending axially and radially inwardly generally parallel to the conical portion of said nut and engageable therewith to maintain said nut and washer in the assembled condition, deflection of the dished section of said washer maintaining a bias on said nut relative to said externally threaded element in a direction toward said one end thereof whereby the crest of the threads on said element are maintained in engagement with the wedge ramp on said internal thread, the flanged portion of said washer having a plurality of longitudinally extending slots therein, the opposed side walls of said slots being disposed in convergent relation when said assembly is unloaded and parallel relation when said assembly is fully loaded so as to give visual indication of said loaded condition.

* * * * *